US006044570A

United States Patent [19]

Nochowitz

[11] Patent Number: 6,044,570

[45] Date of Patent: Apr. 4, 2000

[54] TILE MARKING APPARATUS

[76] Inventor: John Nochowitz, 1113 Jennifer La., Bolingbrook, Ill. 60440

[21] Appl. No.: 08/911,343

[22] Filed: Aug. 14, 1997

[51] Int. Cl.[7] .......... G01B 1/00

[52] U.S. Cl. .......... 33/526; 33/42; 33/41.6

[58] Field of Search .......... 33/42, 41.6, 41.5, 33/41.1, 526, 527

[56] References Cited

U.S. PATENT DOCUMENTS

| | | | |
|---|---|---|---|
| 79,052 | 2/1868 | Blaisdell | 33/526 |
| 266,646 | 10/1882 | Rossman | 33/526 |
| D. 390,136 | 2/1998 | White, Sr. | 33/526 |
| 450,892 | 4/1891 | Potter . | |
| 459,648 | 9/1891 | Potter . | |
| 1,210,147 | 12/1916 | Cederberg . | |
| 2,588,757 | 3/1952 | Peeples, Jr. . | |
| 2,590,243 | 3/1952 | George | 33/526 |
| 2,791,837 | 5/1957 | Denslinger . | |
| 2,796,665 | 6/1957 | Cossock . | |
| 3,286,351 | 11/1966 | McAlister | 33/526 |
| 3,392,449 | 7/1968 | Tierney | 33/526 |
| 3,643,335 | 2/1972 | Smith | 33/526 |
| 5,188,013 | 2/1993 | Cardinale | 33/526 |
| 5,471,758 | 12/1995 | White, Sr. | 33/527 |
| 5,651,184 | 7/1997 | Tutty | 33/526 |
| 5,832,619 | 11/1998 | Volkema, Jr. | 33/526 |

*Primary Examiner*—Bernard Roskoski
*Attorney, Agent, or Firm*—John W. Harbst

[57] ABSTRACT

A tile marking apparatus including an elongated member and a guide for maintaining the elongated member in a predetermined disposition relative to the surface being traced onto a tile. The elongated member of the tile marking apparatus is configured to accommodate a marking device a predetermined distance from a follower end of the apparatus for marking a tile with a profile as the elongated member moves thereover and the follower end engagably traverses the surface with which the tile is to abut. As will be appreciated, the profile marked on the tile corresponds to the profile of the surface with which the tile is to be positioned in abutting relationship. The other piece of the tile marking apparatus of the present invention is a guide. The guide is adjustably connected toward an opposite the follower end of the elongated member for maintaining the elongated member in a substantially constant disposition relative to the surface with which the tile is to abut.

25 Claims, 2 Drawing Sheets

TILE MARKING APPARATUS

FIELD OF THE INVENTION

The present invention generally relates to a tile marking apparatus and, more specifically, to a tile marking apparatus with an adjustable guide extendable therefrom for enhancing the ease and accuracy with which a tile can be marked with an irregular configuration for cutting.

BACKGROUND OF THE INVENTION

When laying tiles, it is customary and well known to start the tile laying process at the center of an area to be covered and work radially outward toward the walls. After the last full width tile is laid, those tiles for the next row are placed over the last, and a loose tile is placed against the wall to which the tile is to be abutted so that an outer edge of the loose tile guides a pencil to mark the unlaid tile thus proving an accurate line indicating the excess that can be cut off. Albeit well known and commonly used, this process is clumsy in handling and difficult, if not inoperative, for curved contours and angled walls. Additionally, the contour or profile of various door jams with which tile is to be arranged in abutting relation have many intricate and difficult patterns to trace.

The problem of tracing a pattern or profile on an underlying tiles is exacerbated by the adhesive used to hold the tiles in place. Often times, the adhesive inadvertently adheres to the tile to be marked, thus, complicating the process.

Various types of devices for marking tiles are known in the art. Such heretofore known devices, however, are typically complex and limited in their directional movement. In this regard, many of such heretofore known devices require the use of both hands for accurate work, thus, limiting the usefulness thereof. Moreover, many of such heretofore known devices cannot withstand the rough usage requirements inherent with laying tiles both as to breakage and maintaining set adjustments.

Thus, there is a continuing need and desire for a tile marking apparatus which is simple yet rugged in construction and which simplifies the tile marking process.

SUMMARY OF THE INVENTION

In view of the above, and in accordance with the present invention, there is provided a multiple piece tile marking apparatus including an elongated member and a guide for maintaining the elongated member in a predetermined disposition relative to the surface being traced onto a tile. The elongated member of the tile marking apparatus is configured to accommodate a marking device a predetermined distance from a follower end of the apparatus for marking a tile with a profile as the elongated member moves thereover and the follower end engagably traverses the surface with which the tile is to abut. As will be appreciated, the profile marked or traced on the tile corresponds to the profile of the surface with which the tile is to be positioned in abutting relationship. The other piece of the tile marking apparatus of the present invention is a guide. The guide is adjustably connected the elongated member for maintaining the elongated member at a substantially constant disposition relative to the surface with which the tile is to abut.

The elongated member preferably has a length greater than that of the tile to be marked. In a preferred form of the invention, the follower end of the elongated member has a finger-like projection for facilitating accurate engagement of the elongated member with the surface being traced. More specifically, the follower end of the elongated member has a generally pointed free end with angularly diverging surfaces extending away therefrom along the length of the elongated member to facilitate tracing of even small changes in the surface profile being traced.

The tile marking apparatus of the present invention is supported for substantially omnidirectional or unrestricted movement above and generally parallel to the tile to be marked. In a preferred form of the invention, the elongated member is supported a predetermined distance above the tile to be marked. More specifically, the elongated member of the tile marking apparatus of the present invention is supported at one end by a stabilizer connected to an underside of the elongated member. To minimize its exposure to adhesive, an opposite end of the elongated member is supported by a pin-like structure depending from the forward end of the elongated member.

The guide of the tile marking apparatus of the present invention is preferably connected to the forward or follower end of the elongated member for movement about a generally vertical axis. That is, the axis about which the guide moves extends generally normal to the centerline or axis of the elongated member thereby allowing a relatively broad range of adjustment for the guide relative to the elongated member.

The guide of the tile marking apparatus includes a pair of generally parallel side surfaces extending along the length thereof. During operation, either side surface of the guide is intended to be arranged generally parallel to the surface with which the tile is to be abutted. As the tile marking apparatus moves to mark the tile, the side surface of the guide serves to stabilize or brace the elongated member against the surface being marked. In a most preferred form of the invention, each side surface of the guide lies in a plane extending substantially tangential to the foremost edge of the follower end of the elongated member when the guide is angularly disposed to either side of the centerline of the tile marking apparatus.

Once the guide is moved into an adjusted position relative to the elongated member, a locking mechanism holds the guide in its adjusted position thereby preventing the guide from shifting during use of the tile marking apparatus. The locking mechanism further serves to releasably secure the guide in a storage position thereby facilitating storage and transportation of the tile marking apparatus.

The guide of the tile marking apparatus of the present invention is preferably carried on an underside of the elongated member. In a preferred form of the invention, an apparatus is carried by the elongated member of the tile marking apparatus for releasably supporting and holding the guide in a storage position beneath the elongated member.

The tile marking apparatus of the present invention can further include an apparatus for adjustably moving the tile marking device relative to the follower end of the tile marking apparatus within a predetermined range of movement. Preferably, the adjustable apparatus is carried by the elongated member. The adjustable apparatus preferably includes a pair of clamping members arranged to engage opposite sides of the marking device. The clamping members are mounted for movement along a path of path of travel extending generally parallel to the longitudinal axis of the elongated member.

The adjustable apparatus for the tile marking device preferably includes a manually adjustable member for positively moving the marking device within a predetermined range of movement. Moreover, the elongated member of the tile marking apparatus includes stops for limiting movement of the clamping members and, thus, the marking device. Suitable indicia can also be provided on the tile marking apparatus for providing a visual indication of the predetermined distance separating the marking device from the follower end of the tile marking apparatus.

Accordingly, a primary object of the present invention involves the provision of a tile marking apparatus which is handy and convenient in operation, constructed to withstand the rugged environment in which it finds utility, and which is configured to allow replication of angled surfaces, corners and curved surface contours onto an underlying tile using only one band. With the present invention, the tile marking apparatus is arranged above the tile to be marked and is movable in any direction along a path generally parallel to the tile being marked. Moreover, and albeit movable in any direction, the tile marking apparatus of the present invention is stabilized in several different ways. First, the stabilizer on the underside of the elongated member serves to stabilize the tile marking apparatus during use. Second, the angled disposition of the guide relative to the elongated member allows a side edge or surface of the guide to braced against a wall being traced thereby serving to further stabilize the tile marking apparatus. Moreover, the side edge on the guide provides a visual indication of the disposition of the elongated member as it moves along the surface to be traced thereby assuring accurate tracing of the contour being marked on the underlying tile. Furthermore, the ability of the present invention to adjust the predetermined distance between the follower end of the elongated member and the tile marking device further adds uniqueness and an enhanced ability to the tile marking apparatus of the present invention.

These aims, objects and advantages of the present invention will be better understood and appreciated from the following detailed description, the drawings and the appended claims.

DETAILED DESCRIPTION OF THE DRAWINGS

DESCRIPTION OF THE PRESENT INVENTION

Figure 1:
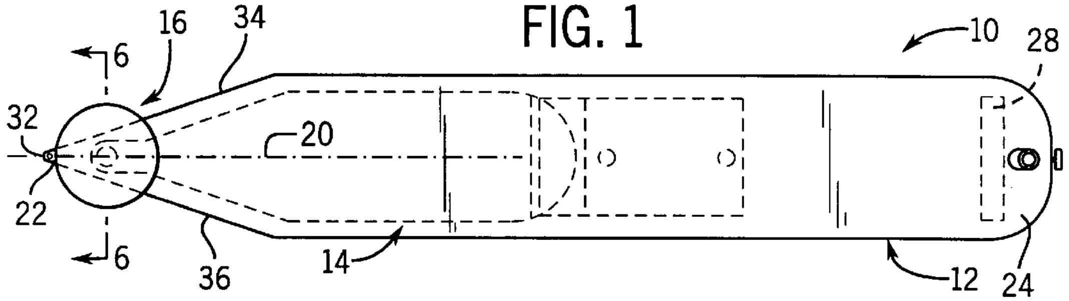
FIG. 1 is a top plan view of a tile marking apparatus according to the present invention.

While the present invention is susceptible of embodiment in various forms, there is shown in the drawings and will hereinafter be described in detail, a specific embodiment of the invention with the understanding that this disclosure is to be considered as setting forth an exemplification of the principles of the invention and is not intended to limit the invention to the specific embodiment illustrated.

Referring now to the drawings, wherein like reference numerals indicate like parts throughout the several views, a tile marking apparatus according to the present invention is generally indicated in FIG. 1 by reference numeral 10. As shown, the tile marking apparatus 10 includes an elongated member 12 with a guide 14 adjustably connected thereto. The elongated member 12 and guide 14 are held together by a locking mechanism 16.

Figure 2:
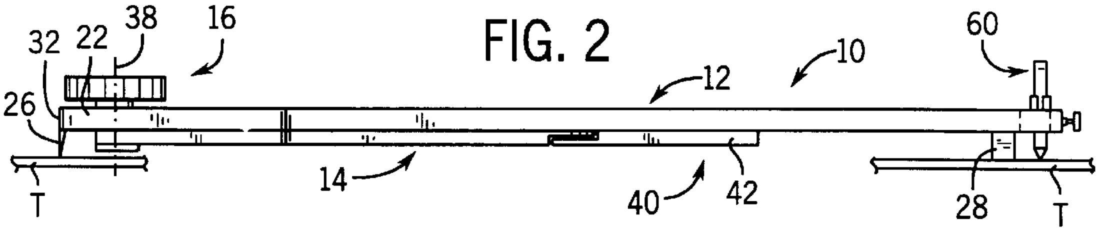
FIG. 2 is a side elevational view of the tile marking apparatus according to the present invention.

In the embodiment of the invention illustrated in FIGS. 1 and 2, the elongated member 12 has a generally planar configuration and defines a longitudinal axis or centerline 20. Preferably, the elongated member 12 is fabricated from any suitable rigid and rugged material such as a metal, i.e. aluminum or steel, a rigid plastic or other suitable composite material, or wood. As shown, the elongated member 12 of the tile marking apparatus 10 has a forward or follower end 22 and a rear or distal end 24 disposed in axial alignment relative to each other. In the illustrated form of the invention, the elongated member 12 has an overall length ranging between about 6 to about 25 inches between opposite ends thereof.

Figure 3:
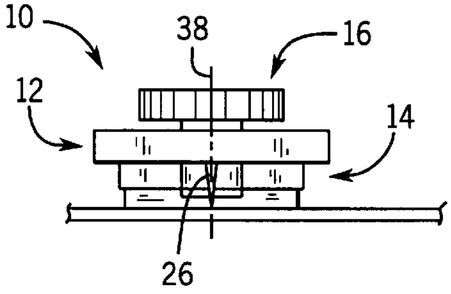
FIG. 3 is a front elevational view thereof.

The tile marking apparatus 12 is supported a predetermined distance above the tile T (FIG. 2) to be marked. As shown in FIGS. 2 and 3, opposite ends of the elongated member 12 are supported in a manner allowing for free movement of the tile marking apparatus 10 in any direction and generally parallel to the tile to be marked. In the illustrated form of the invention, the elongated ember includes forward and rear supports 26 and 28, respectively, depending from an underside thereof.

Figure 4:
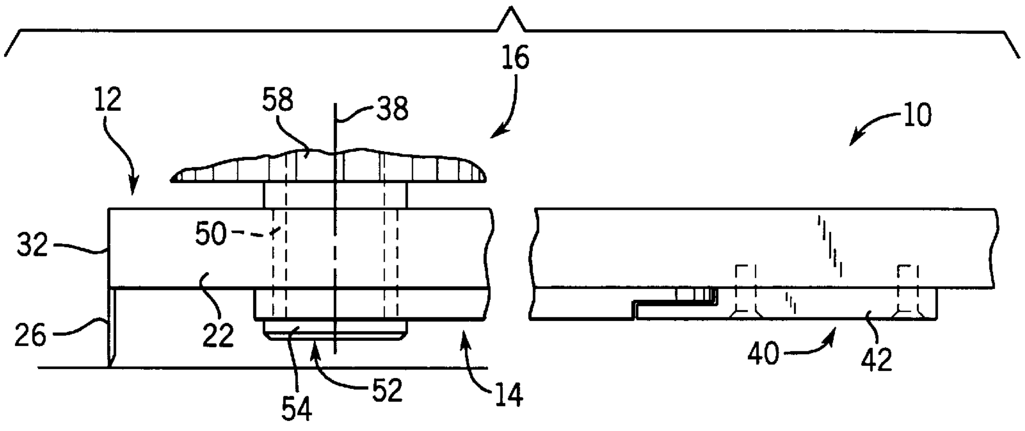
FIG. 4 is an enlarged fragmentary side elevational view of the present invention.

As shown in FIG. 4, to minimize the exposure of the tile marking apparatus 10 to adhesive and the like during operation hereof, the support 26 at the forward end 22 of the elongated member 12 has a reduced cross-sectional surface area. Preferably, support 26 is in the form of a pin-like structure rigidly secured to and depending from the free forward or follower end of the elongated member 12.

To facilitate stabilization of the elongated member 12 during use thereof, the support 28 at the rear or distal end 24 of the elongated support 12 has a relatively broad surface contacting area. That is, and as shown in FIG. 1, the support 28 extends across substantially the entire width of the elongated member 12 to add stabilization thereto as the tile marking apparatus 10 of the present invention is slid over a tile.

To promote accurate operation of the tile marking apparatus 10, the forward end 22 of the elongated member 12 is configured with a relatively narrow extension terminating in a finger or feeler which tapers to a point 32 for engaging with the surface whose profile is to be traced onto the tile. In that embodiment of the invention shown in FIG. 1, the follower end of the elongated member 12 is further configured with a pair of angled surfaces 34 and 36 extending rearwardly from the point 32 and which diverge away from each other to facilitate placement of the follower end 32 of the tile marking apparatus 10 in areas having tight space constraints.

The guide 14 of the tile marking apparatus 10 is adjustably connected toward the forward or follower end 22 of the elongated member 12. As shown, the guide 14 has a generally planar configuration between opposite ends and is preferably fabricated from a rugged and relatively rigid material such as metal, i.e. aluminum or steel, a rigid plastic or other suitable composite material, or wood. Guide 14 preferably has a length ranging between about one-quarter to about one-half the overall length of the elongated member 12.

As shown in FIGS. 2 and 3, the guide 14 is preferably connected to the elongated member 12 of the tile marking apparatus 10 for movement about an axis 38 extending generally normal or perpendicular to the longitudinal axis 20 of the elongated member 12. In the illustrated form of the invention, the guide 14 is carried on the underside of the elongated member 12.

As shown in FIGS. 2 and 4, an apparatus 40 is arranged in combination with the elongated member 12 for releasably holding the guide 14 in a storage position (shown in dotted lines in FIG. 1) during non-use of the tool 10. In the illustrated form of the invention, apparatus 40 includes a latch 42 configured to engage and hold the free end of the guide 14. The latch 42 is configured to allow the free end of the guide 14 to be moved into engagement therewith thus allowing the latch 42 to engage and support the free end of the guide 12. In the illustrated form of the invention, the latch 42 has a step-like configuration which cooperates with a reduced cross-sectional configuration of the free end of the guide 14. Other configurations, i.e. complementary chamfers on the free end of the guide 14 and latch 42 would equally suffice. Moreover, it should be appreciated, with limited redesign effort, the guide 14 could likewise be arranged on the upperside or surface of the elongated member 12 without detracting or departing from the spirit and scope of the present invention.

Figure 5:
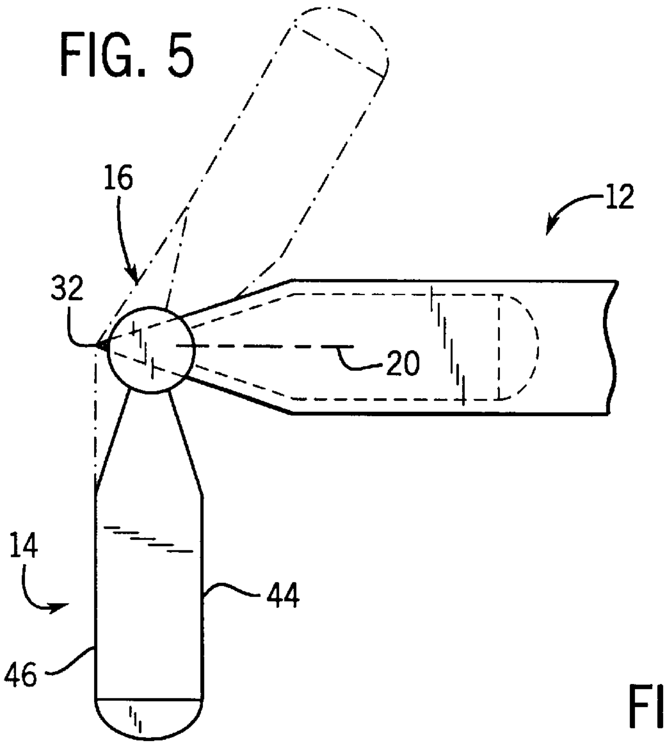
FIG. 5 is a fragmentary top plan view illustrating various positions attainable by a guide forming part of the present invention.

Turning to FIG. 5, guide 14 of the tile marking apparatus 10 further includes a pair of elongated and generally parallel side edges 44 and 46 extending along a major lengthwise portion of the guide 14. As shown in FIG. 5, each side surface or edge 44, 46 of the guide 14 lies in a vertical plane extending substantially tangential to the foremost edge or point 32 of the elongated member 12 when the guide 14 is angularly disposed relative to the longitudinal axis or centerline 20 of the elongated member 12.

Figure 6:
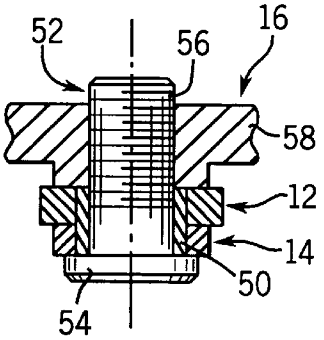
FIG. 6 is a sectional view taken along line 6—6 of FIG. 1.

As shown in FIGS. 4 and 6, the locking mechanism 16 preferably includes a generally cylindrical sleeve 50 extending between the elongated member 12 and guide 14. To promote secure locking of the guide 14 in an adjusted position, the length of sleeve 50 is slightly less than the cumulative thickness of the elongated member 12 and guide 14. In the illustrated form of the invention, a fastener 52 extends upwardly through the sleeve 50. Fastener 52 preferably includes an enlarged head portion 54 with a shank portion 56 extending therefrom. The configuration of the enlarged head portion 54 prevents the fastener from being drawn through the sleeve 50. The shank portion 56 has a length greater than that of the sleeve 50 and includes external threading at the distal end thereof. A knob 58 or other suitable form of manual tightening device is threadably connected to the distal end of fastener 52. As will be appreciated, when the knob 58 is tightened onto the fastener 52, it draws the elongated member 12 and guide 14 into compressive relationship with each other thereby securing the guide 14 in an adjusted position relative to the elongated member 12.

Figure 7:
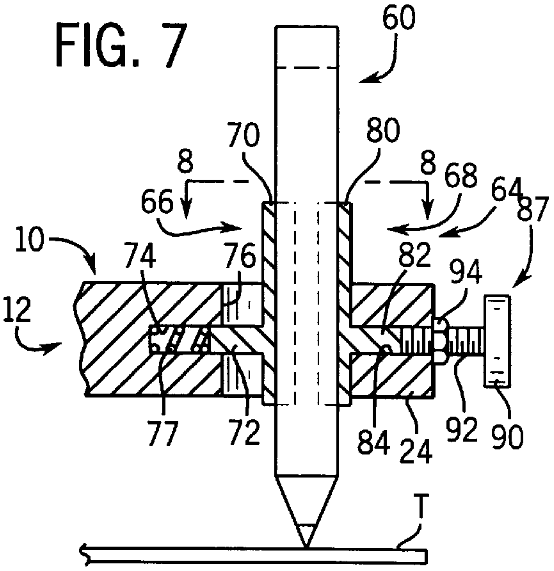
FIG. 7 is an enlarged fragmentary longitudinal sectional view of an aft end of the tile marking apparatus of the present invention.

As shown in FIGS. 2 and 7, a suitable marking device 60 is arranged in combination with the tile marking apparatus 10. In a preferred form, marker 60 comprises a pencil which is carried by the elongated member 12 to mark the underlying tile T with a pattern corresponding to that traced by the follower point 32 arranged toward an opposite end of the elongated member 14. Although a pencil is shown in combination with the elongated member 14, it will be appreciated that other suitable forms of marking devices, i.e., pens, or felt tip markers would equally suffice without detracting or departing from the spirit and scope of the present invention.

A preferred form of tile marking apparatus 10 further includes an apparatus 64 for adjustably moving the tile marking device 60 relative to the follower point 32 of the tile marking apparatus 10 within a predetermined range of movement. In the illustrated form of the invention, apparatus 64 includes a pair of clamping members 66 and 68 adapted to be arranged on opposite sides of the marking device 60 so as to clamp the marking device 60 therebetween. The clamping members 66, 68 are carried or arranged on the elongated member 12 for movement along a predetermined path of travel extending generally parallel to the longitudinal axis 20 of the elongated member 12.

Figure 8:
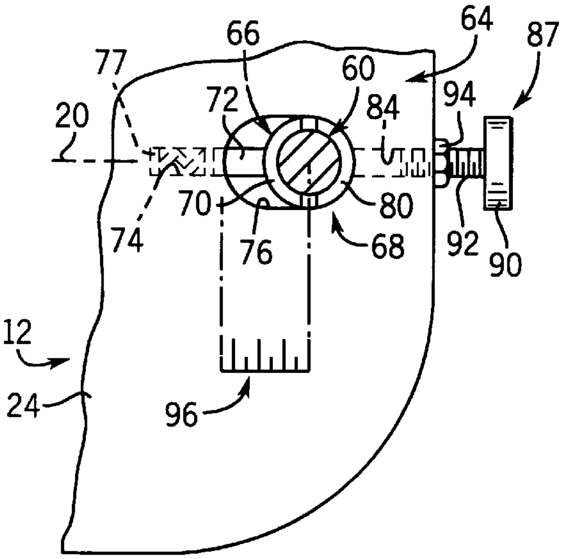
FIG. 8 is an enlarged fragmentary top elevational view of a rear portion of the tile marking apparatus of the present invention.

As shown in FIG. 7, the clamping member 66 includes a upright flange 70 preferably having a generally semicircular cross-sectional configuration thereto. A shank portion 72 of clamping member 66 extends away from and generally perpendicular to the flange 70 and is received for endwise sliding movement within a blind bore 74 defined by the elongated member 12. Notably, the upright flange 70 of clamping member 66 passes through a slot 76 defined in the elongated member 12 thereby preventing the clamping member 66 from turning about the axis of the shank portion 72 of the clamping member 66. As shown, the slot 76 has an elongated configuration extending generally parallel to the axis 21 of the elongated member 12. Moreover, and as shown in the drawings, a spring 77 is seated within the bore 74 to continually urge the clamping member 66 toward the right, as shown in FIGS. 7 and 8, into engagement with one side of the marking device 60. Moreover, and as shown in FIGS. 7 and 8, the end portion of slot 76 acts as a stop to limit the range of movement of the clamping member 66 within a predetermined range of travel.

As will be appreciated from an understanding of the present invention, the cross-sectional configuration of the flange 70 of the clamping member 66 can take a myriad of forms other than semi-circular. For example, the cross-sectional configuration of the flange 70 of clamping member 66 could be in the form of a V-shape to entrap the marking device therewithin without detracting or departing from the spirit and scope of the present invention.

As shown in FIG. 8, the clamping member 68 includes a upright flange 80 preferably having a generally semicircular cross-sectional configuration thereto. A shank portion 82 of clamping member 68 extends away from and generally perpendicular to the flange 80 and is received for endwise sliding movement within a throughbore 84 defined by and opening to the aft end of the elongated member 12. Notably, the upright flange 80 of clamping member 68 likewise passes through the slot 76 defined in the elongated member 12 thereby preventing the clamping member 68 from turning about the axis of the shank portion 82 of the clamping member 68. As shown, a manually adjustable member 87 acts to position the clamping member 68 and thereby the marking device 60 against the action of spring 77 within the slot 76 and, thus, relative to the follower point 32. Moreover, and as shown in FIGS. 7 and 8, the opposite end portion of slot 76 acts as a stop to limit the range of movement of the clamping member 68 to the right as shown in FIGS. 7 and 8, and within a predetermined range of travel.

As will be appreciated from an understanding of the present invention, the cross-sectional configuration of the flange 80 of the clamping member 68 can take a myriad of forms other than semi-circular. For example, the cross-sectional configuration of the flange 80 of clamping member 68 could be in the form of a V-shape to entrap the marking device 60 therewithin without detracting or departing from the spirit and scope of the present invention.

As shown in FIGS. 7 and 8, the manually adjustable member 87 preferably includes an enlarged head portion 90 which is manually graspable from a rear end of the elongated member 12 with a threaded shank portion 92 extending therefrom. The threaded shank portion 92 is preferably configured with a relatively fine pitch of external threading extending therealong. The threading along the shank portion 92 of the manually adjustable member 92 engages with internal threading in the throughbore 84 of the elongated member 12. As shown, the free end of the shank portion 92 of the adjustable member 87 is configured to abut and endwise position the shank portion 82 of the clamping member 68 within the bore 84. Moreover, and as shown in FIGS. 7 and 8, the tile marking apparatus of the present invention can further include a locking mechanism 94 for releasably securing the adjustable member 87 and, thus, the marking device 60, in its manually adjusted position.

The tile marking apparatus 10 of the present invention further facilitates location of the tile marking device 60 relative to the follower point 32. As shown in FIG. 8, the elongated member 12 of the tile marking apparatus 10 further includes indicia 96 for visually indicating the position of the tile marking device 60 relative to the follower point 32 on the elongated member 12. In a most preferred form of the invention, the indicia 96 is disposed on an upper surface of the elongated member 12 to indicate the full range of movement of the marking device 60.

When in use, the tile marking apparatus 10 of the present invention is arranged in overlying relation to an unlaid tile that is positioned directly over a laid tile in a previously laid course of tiles and wherein the unlaid tile is the one to be positioned in abutting relation relative to a profiled surface. Thereafter, the follower point 32 of the elongated member 12 is positioned in abutting relation against the surface to be traced and the guide 14 is adjusted relative to the elongated member 12.

Adjustment of the guide 14 is easily and quickly effected by loosening the locking mechanism 16 and repositioning of the guide 14 relative to the elongated member 12. Following its adjustment, the locking mechanism 16 is again adjusted to secure the guide 14 in place relative to the elongated member 12. Adjustment of the guide 14 is effected by moving the guide 14 relative to the elongated member 12 until a side edge 44, 46 thereof engages and generally parallels the profiled surface to be traced onto the tile. In this regard, an advantage of the present invention is that the tile marking apparatus 10 is movable in substantially any direction to effectively and quickly trace the profile of the surface to be traced onto the tile.

After the follower point 32 of the apparatus 10 is adjustably positioned, and the guide 14 has been adjusted, the tile marking apparatus is guided across the tile to be marked. As the present invention is guided across the tile to be marked, the follower end 22 of the apparatus 10 is removed from the tile by the front or pin-like support 26 thereby maintaining minimum exposure of the tile marking apparatus 10 to the adhesive normally present when laying tiles. The rear support 28 serves to stabilize the elongated member 12.

As the apparatus 10 of the present invention is guided across the tile, the guide 14 serves two important function. First, the edge 44, 46 of the guide 14 immediately adjacent the profiled surface being traced provides a visual indication of the proper orientation of the elongated member 12 relative to the surface being traced. That is, if the side edge 44, 46 of the guide 14 is separated from the surface being traced, a visual indication is provided that the orientation of the marking device 60 carried by the elongated member 12 has shifted from the adjusted position. Accordingly, the profile traced onto the tile will not be accurate. As long as the edge 44, 46 of the guide 14 remains in engagement with the profiled surface being traced, the orientation of the elongated member 12 will be substantially constant thereby assuring proper marking of the tile with a profile corresponding to that traced by the follower point 32 on the elongated member 12.

The guide 14 also serves to brace or stabilize the tile marking apparatus 10 as it moves across the tile being marked. Once the guide 14 is adjusted such that the edge 44, 46 is in abutting relationship to the profiled surface being marked, the friction between the edge 44, 46 and the surface serves to enhance stabilization of the elongated member 12 as it moves to trace the pattern on the tile.

Another advantage of the present invention, concerns the adjustability of the marking device 60 relative to the follower point 32. As will be appreciated by those skilled in the art, not all tiles are sized exactly the same. There may be tolerance differences and other reasons for the tiles vary in size relative to each other. With the present invention, these size differences, in otherwise similar tiles, are readily accommodated thereby assuring proper sizing of the tiles.

With the present invention, the apparatus 64 allows for the tile marking device 60 to be adjusted within a predetermined range of movement. If the tile to be marked is shorter than the past tiles, the locking mechanism 94 for the manually adjustable member 87 is released to allow for adjustment of the marking device 60 relative to the follower point 32 of the tile marking apparatus 10. Following adjustment, the locking mechanism 94 is preferably secured to prevent inadvertent movement of the marking device 60 relative to the follower point 32.

As will be appreciated, if the tiles to be marked are longer than those previously used the tile marking apparatus 10 of the present invention further accommodates such change in sizes. Again, the locking mechanism 94 is released to allow for ready adjustment of the adjusting member 87. In this instance, the manually adjustable member 87 is adjusted in an opposite direction from that described above. As the adjusting member 87 is retracted, the resilient force of the spring 77 pushes the clamping members 66 and 68 and the marking device 60 along therewith to abutting relationship with the free end of the adjustable member 87. Once the adjustment is completed, the locking mechanism 94 secures the adjusting member 87 against further inadvertent movement thereby securing the marking device 60 in place.

To furthermore facilitate adjustment of the tile marking apparatus 10, the indicia 96 on the elongated member 12 provides a visual indication of the relationship of the marking device 60 relative to the follower point 32. Accordingly, the marking device an be adjusted to properly and readily position it relative to the follower point 32.

When storing the tile marking apparatus 10, the guide 14 is positioned in generally parallel relation relative to the elongated member 12. The locking mechanism 16 serves to releasably hold the guide 14 in place relative to the elongated member 12. In the preferred form of the invention, the apparatus 40 carried by the elongated member 12 serves to further releasably support the guide 14 in place relative to the elongated member 12.

From the foregoing, it will be observed that numerous modification and variations can be effected without departing from the true spirit and scope of the novel concept of the present invention. It will be appreciated that the present disclosure is intended as an exemplification of the invention and is no intended to limit the invention to the specific embodiment illustrated. The disclosure is intended to cover the appended claims all such modifications that fall within the scope of the claims.

What is claimed is:

1. A tile marking apparatus, comprising:

an elongated member defining a longitudinal axis for such apparatus, said member being configured to accommodate a marking apparatus a predetermined distance from one end thereof for marking a tile adapted to be positioned in abutting relationship relative to a surface as said elongated member moves thereover with said one end in engagement with said surface thereby allowing the contour of said surface to be traced onto said tile; and a guide pivotally connected about a fixed axis to said elongated member for allowing said guide to be selectively moved to opposite lateral sides of said longitudinal axis so as to provide a vial indication of the orientation of said elongated member relative to said surface thereby maintaining the elongated member in a substantially constant disposition relative to said surface whereby maintaining said marking apparatus a substantially constant distance from said surface being traced.

2. The tile marking apparatus according to claim 1 wherein said elongated member is supported at opposite ends thereof for free movement in any direction generally parallel to an underlying tile being marked.

3. The tile marking apparatus according to claim 2 wherein a stabilizer is provided on an underside of said elongated member toward one end of thereof for supporting said elongated member a predetermined distance above said tile being marked, and a pin is provided for elevating an opposite end of said elongated member.

4. The tile marking apparatus according to claim 1 wherein said guide comprises an elongated support having a pair of opposed side edges.

5. The tile marking apparatus according to claim 1 further including an apparatus carried by said elongated member for adjustably moving said tile marking device relative to the ends of said elongated member within a predetermined range of movement.

6. A tile marking apparatus, comprising:

an elongated member defining an elongated axis and having a forward end and a rearward end and which is supported a predetermined distance above an underlying tile to be marked, and with the rear end of said elongated member being configured to releasably accommodate a marking apparatus a predetermined distance from said forward end of said elongated member for tracing a surface profile onto said underlying tile, and with the forward end of said member being configured with a narrowed forward section adapted to facilitate tracing of even small changes in the surface profile being traced; and a guide pivotally connected to said elongated member for selective movement to either lateral side of said elongated axis about a fixed axis extending generally normal to said elongated member to provide a visual indication of the orientation of said elongated member relative to said surface thereby maintaining said marking apparatus a substantially constant distance from said surface during a tile marking process, and wherein said guide braces said elongated member as it moves along said surface during marking of said underlying tile.

7. The tile marking apparatus according to claim 6 wherein a pin-like structure depends from and supports a forward end of said elongated member said predetermined distance above the underlying tile to be marked.

8. The tile marking apparatus according to claim 7 wherein a stabilizer is provided on the underside of and toward a rear end of said elongated member for supporting said elongated member said predetermined distance above the underlying tile to be marked.

9. The tile marking apparatus according to claim 6 wherein said guide includes a pair of generally parallel side surfaces.

10. The tile marking apparatus according to claim 9 wherein each side surface of said guide lies in a vertical plane extending substantially tangential to a forward end of said elongated member as long as said guide is angularly disposed relative to said common axis.

11. The tile marking apparatus according to claim 6 further including a mechanism for releasably locking said guide in an adjusted position relative to said elongated member.

12. The tile marking apparatus according to claim 6 further including an apparatus carried by said elongated member for releasably holding said guide in a storage position relative to said elongated member.

13. The tile marking apparatus according to claim 6 further including an apparatus carried by said elongated member for adjustably moving said marking apparatus within a predetermined range of movement relative to a foremost end of said elongated member.

14. The tile marking apparatus according to claim 6 wherein a foremost end of said elongated member is configured with a pair of converging side edges terminating in an area having a width significantly reduced from the remaining width of the elongated member to facilitate tracing of the vertical surface.

15. An apparatus for marking an unlaid tile positioned directly over a laid tile in a previously laid course of tiles and which is positioned in abutting relation relative to a surface, said tile marking apparatus comprising:

an elongated member having a forward end and a rearward end aligned relative to each other along a longitudinal axis of said elongated member, said elongated member being supported for free movement in any direction over and generally parallel to said underlying tile, with the forward end of said elongated member having a generally point-like configuration for engaging said surface, with a marking device releasably carried toward the rear end of said elongated member, a predetermined distance from said forward end of said elongated members, for marking said underlying tile with a pattern corresponding to the configuration of said surface traversed by the point-like forward end of said elongated member; and a movable guide connected to an underside of said elongated member for pivotal movement about a fixed axis to opposite lateral sides of said longitudinal axis of said elongated member to provide a visual indication of the orientation of said elongated member relative to said surface thereby maintaining said marking device a substantially constant distance from said surface during a tile marking process, and wherein said guide braces the forward end of said elongated member as it moves along said surface during marking of said underlying tile.

16. The tile marking apparatus according to claim 15 wherein the forward end of said elongated member includes a pin-like structure depending therefrom for supporting the elongated member in a preset relationship relative to the tile to be marked, and wherein the rear end of said elongated member is supported by a stabilizer extending generally normal to and beneath the underside of said elongated member.

17. The tile marking apparatus according to claim 15 wherein said guide includes a pair of generally parallel side surfaces.

18. The tile marking apparatus according to claim 17 wherein each side surface of said guide lies in a vertical plane extending substantially tangential to a forward end of said elongated member.

19. The tile marking apparatus according to claim 15 further including a locking mechanism for releasably locking said guide in an adjusted position relative to said elongated member.

20. The tile marking apparatus according to claim 15 further including an apparatus carried by said elongated member for releasably holding said guide in a storage position relative to said elongated member.

21. The tile marking apparatus according to claim 15 further including an apparatus carried by said elongated member for positively moving said marking device within a predetermined range of movement relative to a foremost end of said elongated member.

22. The tile marking apparatus according to claim 21 wherein said apparatus comprises a pair of clamping members adapted to engage opposed sides of said marking device and which are arranged for movement along a path generally parallel to the longitudinal axis of said elongated member.

23. The tile marking apparatus according to claim 22 wherein said apparatus further includes a manually adjustable member operably connected to said clamping members for moving said marking device within said predetermined range of movement.

24. The tile marking apparatus according to claim 23 wherein said elongated member includes stops for limiting movements of said clamping members.

25. The tile marking apparatus according to claim 21 wherein said elongated member defines indicia for providing a visual indication of the position of said marking device relative to the foremost end of said elongated member.

* * * * *